(12) United States Patent
McGee et al.

(10) Patent No.: US 7,939,169 B2
(45) Date of Patent: May 10, 2011

(54) THERMOPLASTIC OLEFIN POLYMER BLEND AND ADHESIVE FILMS MADE THEREFROM

(75) Inventors: Robert L. McGee, Midland, MI (US); Allen W. Ross, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/305,312

(22) PCT Filed: May 17, 2007

(86) PCT No.: PCT/US2007/011822
§ 371 (c)(1),
(2), (4) Date: Dec. 17, 2008

(87) PCT Pub. No.: WO2008/005110
PCT Pub. Date: Jan. 10, 2008

(65) Prior Publication Data
US 2009/0208765 A1 Aug. 20, 2009

Related U.S. Application Data

(60) Provisional application No. 60/817,439, filed on Jun. 29, 2006.

(51) Int. Cl.
*B32B 7/12* (2006.01)
*B32B 5/16* (2006.01)
*B29C 59/00* (2006.01)

(52) U.S. Cl. ........ 428/343; 428/354; 428/355; 428/323; 156/60

(58) Field of Classification Search .................. 428/343, 428/354, 355, 323; 156/60
See application file for complete search history.

(56) References Cited

U.S. PATENT DOCUMENTS

| | | | |
|---|---|---|---|
| 4,501,634 A | 2/1985 | Yoshimura et al. | |
| 4,619,859 A | 10/1986 | Yoshimura | |
| 4,631,308 A * | 12/1986 | Graham et al. | 524/272 |
| 4,684,554 A | 8/1987 | Ou-Yang | |
| 4,714,716 A | 12/1987 | Park | |
| 4,835,218 A | 5/1989 | Yoshimura et al. | |
| 4,916,198 A | 4/1990 | Scheve et al. | |
| 5,100,721 A | 3/1992 | Akao | |
| 5,153,039 A * | 10/1992 | Porter et al. | 428/36.92 |
| 5,272,236 A | 12/1993 | Lai et al. | |
| 5,278,272 A | 1/1994 | Lai et al. | |
| 5,346,963 A | 9/1994 | Hughes et al. | |
| 5,407,751 A | 4/1995 | Genske et al. | |
| 5,527,573 A | 6/1996 | Park et al. | |
| 6,225,366 B1 | 5/2001 | Raetzsch et al. | |
| 6,572,965 B1 * | 6/2003 | McGee et al. | 428/343 |
| 6,593,005 B2 * | 7/2003 | Tau et al. | 428/516 |
| 6,623,866 B2 | 9/2003 | Migliorini et al. | |
| 6,653,523 B1 | 11/2003 | McCormack et al. | |
| 2002/0192466 A1 * | 12/2002 | Lu | 428/355 AC |
| 2003/0091760 A1 * | 5/2003 | Drogou et al. | 428/34.2 |
| 2004/0146730 A1 * | 7/2004 | Holzer et al. | 428/515 |
| 2004/0247837 A1 * | 12/2004 | Enlow et al. | 428/195.1 |
| 2004/0259015 A1 | 12/2004 | Tsubuko et al. | |
| 2006/0030667 A1 * | 2/2006 | Yalvac et al. | 525/191 |
| 2010/0093942 A1 * | 4/2010 | Silvis et al. | 525/240 |

FOREIGN PATENT DOCUMENTS

| | | |
|---|---|---|
| EP | 879844 A1 | 7/1996 |
| EP | 721006 A1 | 11/1998 |
| WO | WO 9964533 | 12/1999 |
| WO | WO2000044845 A1 | 8/2000 |
| WO | WO 2006041654 | 4/2006 |

OTHER PUBLICATIONS

Lotryl flyer, Jul. 2004, http://www.arkema-inc.com/tds/1078.pdf.*
*Film Extrusion Manual, Process Materials, Properties*, prepared by the Film Extrusion Committee of the Polymers, Laminations and Coatings Division, TAPPI, and edited by Thomas I. Butler and Earl W. Veazey, TAPPI Press, 1992, Chapter 3.

\* cited by examiner

*Primary Examiner* — Callie E Shosho
*Assistant Examiner* — Samir Shah

(57) ABSTRACT

Disclosed is a multilayer film having: (A) an adhesive layer comprising at least about 40 weight percent of an ethylene/alkyl acrylate copolymer and at least about 20 weight percent of a low density polyethylene, and at most about 7 weight percent filler; (C) a barrier layer comprising at least about 90 weight percent high density polyethylene; and (B) a core layer comprising at least about 20 weight percent linear low density polyethylene, at least about 20 weight percent low density polyethylene, at least about 10 weight percent high density polyethylene and at most about 5 weight percent filler. Such a film is useful to protect surfaces and preferably adheres when needed for protection and is removable after protection is no longer desired.

14 Claims, No Drawings

THERMOPLASTIC OLEFIN POLYMER BLEND AND ADHESIVE FILMS MADE THEREFROM

This application claims the benefit of U.S. Provisional Application 60/817,439, filed Jun. 29, 2006.

This invention relates generally to a multilayer film useful for protecting surfaces and to the compositions of the layers thereof. The invention also relates to processes for making such films.

It would be desirable to protect surfaces using a film. Preferably the film would curl to an extent sufficient to help protect the edges of a surface. Preferably, the film would adhere when needed for protection and be removable later if desired.

SUMMARY OF THE INVENTION

The invention includes a multilayer film having at least 2 layers: (A) an adhesive layer comprising at least about 40 weight percent of an ethylene/alkyl acrylate copolymer having a Vicat point (ASTM D1525) of no more than 40° centigrade (° C.), at least about 1 and at most about 10 weight percent of an ethylene/α, β-ethylenically unsaturated carboxylic acid copolymer, and at least about 20 weight percent of a low density polyethylene, and 0 to at most about 7 weight percent filler, hereinafter referred to as composition A; and (C) a barrier layer comprising at least about 90 weight percent high density polyethylene, hereinafter referred to as composition C, in each layer, the percentages being based upon combined weight of polymers and filler and selected to total 100 percent by weight. Preferably the film further comprises at least one layer (B) a core layer comprising at least about 20 weight percent linear low density polyethylene (LLDPE), at least about 20 weight percent low density polyethylene different from LLDPE, at least about 10 weight percent high density polyethylene and 0 to at most about 5 weight percent filler, hereinafter referred to as composition B, the percentages being based upon combined weight of polymers and filler and selected to total 100 percent by weight. Such a film is useful to protect surfaces. Preferably, the film adheres when needed for protection and is removable after protection is no longer desired. Preferably, the film curls to an extent sufficient to help protect the edges of the protected surface.

The multilayer film of the invention comprises at least 2 layers: a first outer or adhesive layer, a second outer or barrier layer and, optionally, but preferably, at least one layer sandwiched between them referred to herein as a core layer. The multilayer film structure comprises a melt barrier layer, the melt barrier layer having a first major planar surface and, spaced apart from and generally parallel to the first major planar surface, a second major planar surface, and an adhesive film layer comprising the polymer blend composition of the adhesive layer of the invention, the adhesive layer having a first major planar surface and, spaced apart from and generally parallel to the first major planar surface, a second major planar surface, a major planar surface of the melt barrier layer being directly or indirectly bonded to a major planar surface of the adhesive film layer where indirect bonding refers to bonding through a core layer.

Another aspect of this invention is a strippable (removable) adhesive film that comprises the multilayer film structure previously described. The strippable adhesive film may be used to protect surfaces, preferably of solid materials, such as painted wood, wood product, or cementitious material surfaces, painted or coated metal surfaces, or plastic surfaces. Paints suitable for use in preparing for such painted surfaces include acrylic paints and epoxy-based paints. Thus, another aspect of the invention is a laminate of the multilayer film directly adhered to a solid material, preferably those listed or a combination thereof. In one preferred embodiment of the invention, the multilayer film of the invention is advantageously applied before the characteristics of the protected surface are completely formed, for instance, applied to a (optionally freshly) painted or plastic surface before it is completely dry or cured. Hereinafter, such surfaces are referred to as incompletely hardened surfaces.

DETAILED DESCRIPTION OF THE INVENTION

As used herein, "coextrusion," and "coextrude," refer to the process of extruding two or more materials through a single die with two or more orifices arranged so that the extrudates merge and weld together into a laminar structure before cooling or chilling, that is, quenching. Coextrusion is often employed as an aspect of other processes, for instance, in blown film and cast film processes.

As used herein, "copolymer" refers to polymers having two different monomers polymerized therein, "terpolymer" refers to polymers having three different monomers polymerized therein and "tetrapolymer" refers to polymers having four different monomers polymerized therein. "Interpolymer", as used herein, collectively includes copolymer, terpolymers, tetrapolymers and other polymers having five or more different monomers polymerized therein.

All percentages, preferred amounts or measurements, ranges and endpoints thereof herein are inclusive, that is, "less than about 10" includes about 10. "At least" is, thus, equivalent to "greater than or equal to," and "at most' is, thus, equivalent "to less than or equal to." Numbers herein have no more precision than stated. Thus, "105" includes at least from 104.5 to 105.49. Furthermore, all lists are inclusive of combinations of any two or more members of the list. All ranges from a parameters described as "at least," "greater than," "greater than or equal to" or similarly, to a parameter described as "at most," "up to," "less than," "less than or equal to" or similarly are preferred ranges regardless of the relative degree of preference indicated for each parameter. For instance, a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Unless stated otherwise or recognized by those skilled in the art as otherwise impossible, steps of processes described herein are optionally carried out in sequences different from the sequence in which the steps are listed or discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and may be set by predetermination, such as performance specifications. Those skilled in the art recognize that acceptable limits vary with equipment, conditions, applications, and other variables but can be determined without undue experimentation in each situation where they are applicable. In some instances, variation or deviation in one or more parameters may be acceptable to achieve another desirable end.

The present invention comprises at least one adhesive layer and at least one melt barrier layer, and, preferably, additionally at least one core layer.

The adhesive layer comprises at least one ethylene/alkyl acrylate copolymer, at least one low density polyethylene, and at least one ethylene/α, β-ethylenically unsaturated carboxylic acid copolymer. The ethylene/alkyl acrylate copolymer has a Vicat point (ASTM D1525) of no more than 40° centigrade (° C.) and is present in an amount of advantageously at least about 40, preferably at least about 45, more preferably at least about 50, most preferably at least about 55, advantageously at most about 70, preferably at most about 65, more preferably at most about 60 weight percent based on total weight of the adhesive layer. The low density polyethylene (LDPE) is preferably at least about 20, more preferably at least about 25, most preferably at least about 30, preferably at most about 40, more preferably at most about 35 weight percent based on total weight of the adhesive layer. The ethylene/α, β-ethylenically unsaturated carboxylic acid copolymer is present in an amount preferably at least about 1, more preferably at least about 2, most preferably at least about 2.5, advantageously at most about 10, preferably at most about 8, more preferably at most about 6, most preferably at most about 5 weight percent based on total weight of the adhesive layer. The polymer blend of the adhesive layer is optionally converted to a polymer film, for example by extrusion processing into a film or onto a substrate or collection surface, or by being blown into a film, preferably after or in conjunction with being coextruded with additional layers.

The ethylene/alkyl acrylate copolymer has a Vicat point or Vicat softening point temperature of no more than 40° centigrade (° C.). Determine Vicat point according to American Society for Testing and Materials (ASTM) test method D1525. The amount of alkyl acrylate that will yield such a Vicat point varies depending upon the alkyl acrylate. The alkyl acrylate is preferably selected from the group consisting of methyl acrylate, butyl acrylate and 2-ethylhexyl acrylate. Preferred alkyl acrylate contents, based on copolymer weight, range from: 26 to 31 percent by weight (wt %) methyl acrylate, 33 to 37 wt % butyl acrylate and 34 to 38 wt % 2-ethylhexyl acrylate. With alkyl acrylate amounts lower than (<) the above contents, the copolymers tend to be more crystalline and have Vicat points in excess of 40° C. With alkyl acrylate amounts greater than (>) the above contents, the copolymers tend to become liquid and lose their solid resinous character. Arkema produces and sells ethylene/methyl acrylate copolymers and ethylene/butyl acrylate copolymers under the trade designation LOTRYL™ and 2-ethylhexyl acrylate copolymers under the trade designation (LOTRYL EH™).

Preferred ethylene/α, β-ethylenically unsaturated carboxylic acid copolymers include ethylene/acrylic acid (EAA) copolymers and ethylene/methacrylic acid (EMAA) copolymers with EAA copolymers being especially preferred. The EAA copolymers have an acrylic acid (AA) content, based upon copolymer weight, that is preferably from 5 to 22 wt %, more preferably from 6 to 21 wt % and still more preferably from 9 to 21 wt %. If desired, two or more EAA copolymers may be blended to provide a desired AA content. An AA content <5 wt % tends to have inadequate adhesive properties and a higher melting point which may make the product more difficult to apply and would likely have poorer peel strength at low temperatures. An AA content >22 wt % is generally not available commercially. The Dow Chemical Company produces and sells EAA copolymers with an AA content of 5 wt % to 20.5 wt % as well as EAA copolymer blends under the trade designation PRIMACOR™.

The blends of the adhesive layer also contain an amount of a low density polyethylene (LDPE), that is a polyethylene having a density of from about 0.91 to about 0.94 g/cm$^3$ produced using radicals, for instance from oxygen or peroxide catalysts, at high pressure. Suitable low density polyethylenes are commercially available, for instance LDPE commercially available from The Dow Chemical Company under the trade designations 681i, 662i and 5004i.

The LDPE is distinguished from linear low density polyethylene (LLDPE) which is a homopolymer or copolymer of ethylene and with at least one alpha olefin wherein the alpha olefin (AO or α-olefin) contains from 3 to 20 carbon atoms ($C_{3-20}$), made using transition metal catalysts and having a density from 0.915 to 0.925 g/cm$^3$. Suitable α-olefins are aliphatic α-olefins containing from 3 to 20, preferably from 3 to 12, more preferably from 3 to 8 carbon atoms ($C_{3-20}$, $C_{3-12}$, $C_{3-8}$). As used herein, subscripts indicate the number of, for example carbon (C) atoms contained in a monomer. Particularly suitable α-olefins include ethylene, propylene, butene-1,4-methyl-1-pentene, hexene-1 or octene-1, or ethylene in combination with one or more of propylene, butene-1,4-methyl-1-pentene, hexene-1 and octene-1. Where LDPE has long chain branches as a result of the radical polymerization, the LLDPE is linear except for short chain branches that come from the comonomers. In the practice of the invention, LLDPE is used for all or a portion of the LDPE only when a particularly smooth or glossy surface of the adhesive layer of the film is desired. In applications to incompletely hardened surfaces, this smooth adhesive layer can result in smoothness or glossiness of the protected surface, Optionally, the adhesive layer also contains at least one filler or surface roughening additive. Useful fillers are within the skill in the art and include, mica, talc or an inorganic particulate material, preferably mica. The surface roughening additive has an average particle size that is preferably at least about 0.5 micrometer (aim), more preferably at least about 0.8 μm and most preferably at least about 1 μm, and preferably at most about 3 μm, more preferably at most about 2.5 μm and most preferably at most about 2 μm. A surface roughening additive optionally included a carrier for a particulate roughener; the carrier is preferably polymeric, more preferably a polyolefin, most preferably an ethylene polymer or a polymer otherwise also present in the layer containing the roughening additive. When present, in a layer of the multilayer film structure, preferred surface roughening additive contents are preferably at least about 0.5 weight percent, more preferably at least about 1, most preferably at least about 2, preferably at most about 7, more preferably at most about 6, most preferably at most about 5 weight percent of roughening additive inclusive of optional carrier based upon weight of the adhesive layer, corresponding to a filler content of 0.02 weight percent, more preferably at least about 0.4, most preferably at least about 0.8, preferably at most about 2.8, more preferably at most about 2.4, most preferably at most about 2 weight percent of filler exclusive of optional carrier based upon weight of the adhesive layer. Such materials are commercially available, for instance, a 40% by weight dispersion of mica in HDPE commercially available from DuPont Canada Inc. under the trade designation MICA-FIL™ 40. Optionally, when the filler is commercially available in a carrier, that carrier, for instance HDPE, is present in an amount of up to about twice that of the filler.

Advantageously, the adhesive layer adheres sufficiently to a freshly painted or other soft or incompletely hardened surface to protect it as long as needed, for instance, until the layer is dried, cured or used. More preferably, adhesion endures through heating and cooling, for instance, storage at temperatures from about −30° C. to about 60° C. for periods of up to about several months, preferably a year or more. When removal is desirable, it can be stripped from the surface leaving little, preferably easily removable or, more preferably substantially no, residue visible to the eye or sufficient to stick to other substances such as dirt or interfere with further use, preferably a combination of these. Ability to adhere to uncured or wet acrylic paint and to be removed from dry or cured acrylic paint is preferred for practice of the invention.

The melt barrier layer or barrier layer comprises at least one high density polyethylene (HDPE), that is at least one ethylene polymer, preferably homopolymer, having a density ($\rho$) of at least ($\geqq$) 0.94 grams per cubic centimeter (gm/cc or $g/cm^3$). The barrier layer comprises at least about 90, preferably at least about 95, more preferably 100 weight percent HDPE. When the layer is less than 100 percent HDPE, the remainder is optionally and preferably another polyolefin, more preferably a propylene polymer, most preferably a propylene/ethylene polymer having characteristics desirable for a particular application. For instance a material of a lower secant modulus than HDPE may impart a more desirable feel to the hand. Preferably the added polyolefin would have a melt temperature sufficiently close to that of the HDPE to be compatible and easily processed at the same temperature; for instance preferably within about 15, more preferably within about 10, most preferably within about 5° C. of the melting temperature of the HDPE.

The melt barrier layer, when present, has a melting point that exceeds the melting point for at least one component of the adhesive film layer and effectively prevents molten adhesive film layer polymer from migrating through the multilayer film structure to an external surface of such a structure. Furthermore, it preferably also curls around at least one edge of the surface to which the film is adhered to protect it from damage, such as chipping or scratching. Curling preferably extends over a distance corresponding to the thickness of the material to be protected, for instance over a distance of about 0.4 cm for a typical 0.4 cm sheet, board or laminate. To extend the thickness of the surface protected or at least around a corner of the surface protected, the curl is preferably gentle, that is not tightly rolled in a manner that would resemble a straw and result in difficulties in handling and possible wrinkles or multiple thickness of multilayer film in places, gaps in coverage or combinations thereof.

The intermediate or core layer is between and adheres to the adhesive layer and the barrier layer. It preferably adds sufficient thickness to the multilayer film to improve handling, appearance, tactile properties, or a combination thereof to the multilayer film, preferably at a lower cost, better curling effect or both than using thicker adhesive layer, barrier layer or combination thereof. Alternatively or additionally, the core layer accepts recycle from previous uses of the film. For instance, ends of rolls, odd shaped pieces, pieces with tears or flaws and the like of the multilayer film are ground (referred to as regrind) and added to an extruder with the material to make up the core layer of the next batch of multilayer film. Aside from possible regrind, preferably, the core layer uses a lower concentration of the more expensive components of the adhesive and barrier layers.

The intermediate or core layer, when present, preferably contains at least about 10, more preferably at least about 15, most preferably at least about 17, preferably at most about 25, more preferably at most about 20, most preferably at most about 19 weight percent based on total weight of the core layer of HDPE as described for the barrier layer. In addition, it contains at least about 20, more preferably at least about 35, most preferably at least about 50, preferably at most about 70, more preferably at most about 65 weight percent based on total weight of the core layer of LLDPE and at least about 10, more preferably at least about 15, most preferably at least about 17, preferably at most about 70, more preferably at most about 50, most preferably at most about 25 weight percent based on total weight of the core layer of radical catalyzed LDPE. Optionally, but not preferably, the core layer also contains at least one filler as described for use in the adhesive layer. The amount of filler is preferably 0, but when present preferably at most 7, more preferably at most about 5, most preferably at most about 3 weight percent based on weight of the layer. As in the case of the adhesive layer, there is optionally a corresponding amount of carrier polymer with filler.

Each of the layers independently optionally contains additives within the skill in the art such as antioxidants, UV stabilizers, white or other pigments, and the like. These additives are especially appropriate in the barrier layer where they may help protect the entire multilayer film and possibly the surface adhered thereto.

Individual layer thickness, while not particularly critical, can be chosen to control film manufacturing costs, or one or more physical or mechanical properties of the film.

Components of the adhesive film layer tend to have a higher raw material cost. This factor alone motivates one to use an adhesive film layer that functions as an adhesive, yet is as thin as practical. Based upon total multilayer film thickness, the adhesive film layer has a thickness that is preferably at least about 5, more preferably at least about 10, and preferably at most about 25, more preferably at most about 20, and most preferably at or near 15 percent, measured either as volume percent or as percent of total thickness, either of which result in substantially the same percentage. The thickness of the other layers can be adjusted to provide other potentially desirable physical properties such as curl, tensile properties, tear properties, or stiffness. For a two layer film that includes an adhesive film layer and a melt barrier layer, the melt barrier layer has a thickness that complements the adhesive film layer thickness such that the individual layer thicknesses total 100 percent of the thickness of the multilayer film. In a three layer multilayer film with an adhesive film layer, an intermediate core layer and a melt barrier layer, the barrier layer is preferably at least about 5, more preferably at least about 10, most preferably at least about 15 and preferably at most about 25, more preferably at most about 20, most preferably at or near 15 percent based on total thickness or volume. Correspondingly, the core layer is preferably at least about 50, more preferably at least about 55, most preferably at least about 65 and preferably at most about 90, more preferably at most about 80, most preferably at or near 75 percent based on total thickness or volume. A particularly suitable structure includes, based upon total multilayer film thickness, 15% adhesive film layer, 75% intermediate core layer and 10% melt barrier layer. In each instance, select individual layer thicknesses to provide a total of 100%.

Independently, each "layer" described previously can optionally comprise more than one layer. For instance the adhesive layer is optionally more than one layer, each of which has a composition described for the adhesive layer. Those compositions are the same as one another or different from one another, and each, independently, falls within the description of the adhesive layer. The relative thickness of the layers, described previously, applies to the combination of layers of the specified type. For instance, if the core layer is made up of two layers of core layer composition, together those layers are preferably at least about 50, more preferably at least about 55, most preferably at least about 65 and preferably at most about 90, more preferably at most about 80, most preferably at or near 75 percent based on total thickness or volume. The relative thickness of two or more layers of the same type is determined by processing and compositional considerations. For instance, if one core layer comprises recycled or regrind material from the scrap of previous films, it is preferably from about 20 to about 25 volume percent of the total core layer combination.

Multilayer film structures of the present invention have a total thickness that is preferably at least about 0.5 mil (0.013 mm), more preferably at least about 1 mil (0.025 mm), most preferably at least about 1.5 mil (0.04 mm) and although unlimited conceptually, limited in practicality by cost, preferably at most about 15 mil (0.38 mm), more preferably at most about 10 mils (0.25 mm), most preferably at most about 4 mils (0.1 mm).

*FILM EXTRUSION MANUAL, Process Materials, Properties*, prepared by the Film Extrusion Committee of the Polymers, Laminations and Coatings Division, TAPPI, and edited by Thomas I. Butler and Earl W. Veazey, TAPPI Press, 1992, particularly in Chapter 3, discusses film extrusion processes, particularly blown film and cast film processes. The teachings of this manual indicate the skill in the art and are incorporated by reference herein to the maximum extent permitted by law. Both processes permit recycling of scrap film and edge trim to maximize use of polymer. Blown film production involves extruding molten polymer through an annular opening to form a hot tube of polymer. The tube is then cooled and collapsed into an envelope shape. By way of contrast, cast film is extruded through a flat die with a thin wide opening. The flat curtain of film is cooled rapidly and then sent on for further processing.

Extrusion provides an even, consistent flow of polymer melt to a forming die and uses, what may also be referred to as a screw pump that includes a constant diameter screw, to convey polymer from a feed port to a discharge end. By adding energy to the polymer in the form of shear and heat, one melts the polymer. Polymer compression occurs as extruder screw root diameter increases toward the discharge end.

In a blown film bubble process, a quantity of air is injected into the center of the hot tube of polymer to inflate it to a desired diameter. Prior to inflation, the tube has a typical thickness that ranges from 0.028 inch (0.7 millimeter (mm)) to over 0.1 inch (2.5 mm). After the inflated tube is cooled and collapsed into an envelope shape, it passes through a set of nip rolls before it is slit and wound up.

In the cast film process, extrudate from the die has a thickness that typically ranges from 0.01 inch (0.25 mm) to 0.025 inch (0.63 mm). In chill roll cast extrusion, the extrudate is cast directly onto a polished roll that is chilled via an internal cooling mechanism. An air knife may be used to ensure contact of the extrudate with the chill roll and provide additional cooling.

The multilayer film structures of the present invention have a variety of utilities that range from use as a pressure sensitive adhesive film through use as a strippable, adhesive protective film for any of a number of surfaces. The surfaces, in turn, range from cellulosic material surfaces, such as paper or wood products, through painted surfaces, including painted or coated substrate surfaces, such as painted or coated metal of the types used for metal buildings. They find particular utility as strippable adhesive and protective films for freshly painted acrylic paint surfaces, including partially cured acrylic paint surfaces that are being laminated at a film temperature at or above 160° F. (71.1° C.).

The strippable adhesive film has a 1700 Fahrenheit (° F.) (77° C.) hot bar seal bond strength to a surface selected from the group consisting of paper, polymethylmethacrylate sheet and acrylic paint with a ten second seal time that is greater than the 170° F. (77° C.) hot bar seal bond strength of a multilayer film structure having the same melt barrier layer, and, when present, the same intermediate core layer, but with an adhesive layer that contains the same ethylene/α, β-ethylenically unsaturated acid copolymer and is substantially free of ethylene/alkyl acrylate copolymer.

The following examples illustrate, but do not in any way limit, the present invention. Arabic numerals represent examples (Ex) of the invention and letters of the alphabet designate comparative examples (Comp Ex). All parts and percentages are by weight unless otherwise stated. In addition, all amounts shown in the tables are based on weight of polymer contained in the respective compositions unless otherwise stated.

Each example is produced by the following process:

Coextrude a 3-layer 2.0 mil (50 μm) film using a conventional upward blown film line equipped with a 22 in (55.9 cm) diameter die, four 7.5 cm (2.95 inch) extruders and one 10 cm (3.94 inch) extruder. The film has a nominal ABC structure where outermost layer is A, the central or core layer is B, and the innermost layer is C. The resins of Layer A are mixed by in a 7.5 cm extruder. The resins for core Layer B, are fed by three extruders (two 7.5 cm extruders and a 10 cm extruder all containing the core formulation). Layer C is fed by a 7.5 cm extruder. This combination of extruders allows control of relative thickness of layers while maintaining acceptable rates of film production. Ramp the extruders feeding the layers as follows: Layer A—from 260° F. (127° C.) to 320° F. (160° C.); Layer B—from 260° F. (127° C.) to 320° F. (160° C.); and Layer C—from 230° F. (110° C.) to 250° F. (121° C.). Set the die zones at 320° F. (160° C.). This produces a 84 in (2.13 m) wide lay-flat bubble.

The materials used are:

EAA-1 is an ethylene acrylic acid resin commercially available from The Dow Chemical Company under the trade designation Primacor™ 5980i.

EMA-1 is an ethylene methyl acrylate resin commercially available from Atofina under the trade designation LOTRYL™ 28MA07.

LDPE-1 is a low density polyethylene commercially available from The Dow Chemical Company under the trade designation 681i, having a melt index of 1.2 g/10 min.

LDPE-2 is a low density polyethylene commercially available from The Dow Chemical Company under the trade designation 5004i.

FILLER-1 is a 40% by weight dispersion of mica in HDPE commercially available from DuPont Canada Inc. under the trade designation MICAFIL™ 40.

LLDPE-1 is a linear low density ethylene polymer commercially available from The Dow Chemical Company under the trade designation DOWLEX™ 2247G.

HDPE-1 is a high density polyethylene commercially available from The Dow Chemical Company (Union Carbide Corporation) under the trade designation DMDA 8907 NT7.

Testing is accomplished in several ways. Using a Sentinel™ Brand Heat Sealer Model 1212ASD available from Packaging Industries Group, Inc. of Hyannis, Mass. 02601 heat seal apparatus with a bar temperature set at 250° F., an applied pressure of 30 pounds per square inch (psi) (207 kilopascals (kPa)) and a dwell time of two seconds, effect a bond between layer "A" of the multilayer film structure and 100 Alloy Aluminum foil that is 0.0075 inch in thickness (191 micron). Remove the multilayer film-foil combination from the apparatus and allow it to cool to ambient temperature (nominally 25° C.) and then test its peel strength using procedures outlined in ASTM D1525.

Using procedures outlined in ASTM D882, determine Ultimate Tensile Strength (UTS) in terms of both psi and Newtons per square millimeter (N/mm²), Ultimate Elongation (UE) in terms of %, 2% Secant Modulus in terms of psi and N/mm2, and use ASTM D1922 to determine Elmendorf Tear Strength (ETS) in terms of g/mil (g/μm), in each case in both the machine direction (MD) and transverse direction (TD).

Using a Hagerty Model 538-DFM Roughness Tester and procedures outlined in TAPPI method T 538 om-96, determine the Hagerty Roughness for each film in terms of mL/M or Shefield units for the adhesive side of the film
The following films are made:

TABLE 1

EXAMPLE FILMS 1-4 AND COMPARATIVE SAMPLES A and B

| Example No | 1 | 2 | 3 | 4 | A | B |
|---|---|---|---|---|---|---|
| total film thickness μm | 50 | 50 | 50 | 50 | 50 | 50 |
| Layer A thickness vol % | 15 | 15 | 15 | 15 | 15 | 15 |
| EAA-1 wt % | 3 | 5 | 3 | 3 | 2 | |
| EMA-1 wt % | 60 | 60 | 60 | 60 | 60 | 60 |
| LDPE-1 wt % | 32 | 30 | 32 | 32 | | |
| LDPE-2 wt % | | | | | | 10 |
| LLDPE-1 wt % | | | | | 38 | 30 |
| Filler-1 wt % | 5 | 5 | 5 | 5 | | |
| Layer B thickness vol % | 75 | 75 | 65 | 75 | 75 | 75 |
| LLDPE-1 wt % | 20 | 20 | 20 | 62 | 20 | 20 |
| LDPE-1 wt % | 60 | 60 | 60 | 20 | 60 | 60 |
| HDPE-1 wt % | 18 | 18 | 18 | 18 | 18 | 18 |
| Filler-1 wt % | 2 | 2 | 2 | 0 | 2 | 2 |
| Layer C thickness vol % | 10 | 10 | 20 | 10 | 10 | 10 |
| HDPE-1 wt % | 100 | 100 | 100 | 100 | 100 | 100 |

Films of the invention advantageously have at least one, more advantageously at least 2, even more advantageously at least 3, most advantageously at least 4, preferably at least 5, more preferably at least 6, even more preferably at least 7, and most preferably all 8 of the following properties at least to the functional descriptions and more preferably to ranges of the stated preferences:

In the practice of the present invention, the Ultimate Tensile Strength, MD should be at least sufficient to withstand the forces used during lamination without distortion, but not so high as to be impossible to cut and handle. This corresponds to preferably at least about 10, more preferably at least about 13, most preferably at least about 15 and preferably at most about 30, more preferably at most about 27, most preferably at most about 25 N/mm².

In the practice of the present invention, the Ultimate Tensile Strength, TD should be at least sufficient to withstand the forces used during lamination without distortion, but not so high as to be impossible to cut and handle. This corresponds to preferably at least about 8, more preferably at least about 9, most preferably at least about 10 and preferably at most about 25, more preferably at most about 23, most preferably at most about 20 N/mm².

In the practice of the present invention, the Ultimate Elongation, MD should be at least sufficient to conform to a surface covered or protected by the film, but not so high as to undesirably or excessively elongate during lamination. This corresponds to preferably at least about 250, more preferably at least about 275, most preferably at least about 300 and preferably at most about 750, more preferably at most about 725, most preferably at most about 700 percent.

In the practice of the present invention, the Ultimate Elongation, TD should be at least sufficient to conform to the surface, but not so high as to undesirably or excessively elongate during lamination. This corresponds to preferably at least about 550, more preferably at least about 575, most preferably at least about 600 and preferably at most about 1050, more preferably at most about 1025, most preferably at most about 1000 percent.

In the practice of the present invention, the Elmendorf Tear Strength, both MD and TD, independently should be at least

TABLE 2

PROPERTIES OF EXAMPLE FILMS 1-4 AND COMPARATIVE SAMPLES A and B

| Example No | 1 | 2 | 3 | 4 | A | B |
|---|---|---|---|---|---|---|
| total film thickness μm | 50 | 50 | 50 | 50 | 50 | 50 |
| Ultimate Tensile Strength, MD, psi | 2700 | 2860 | 2800 | 3550 | 2800 | 3000 |
| (N/mm²) | (18.6) | (19.7) | (19.3) | (24.5) | (19.3) | (20.7) |
| Ultimate Tensile Strength, TD, psi | 2150 | 2350 | 2390 | 3110 | 2430 | 2540 |
| (N/mm²) | (14.8) | (16.2) | (16.5) | (21.4) | (16.8) | (17.5) |
| Ultimate Elongation, MD, % | 330 | 300 | 440 | 640 | 340 | 350 |
| Ultimate Elongation, TD, % | 630 | 630 | 670 | 740 | 650 | 690 |
| Elmendorf Tear Strength MD, grams/mil (g/μm) | 130 (5.2) | 50 (2.0) | 65 (2.6) | 150 (6.0) | 110 (4.4) | 100 (4.0) |
| Elmendorf Tear Strength, TD, grams/mil (g/μm) | 300 (12.0) | 370 (14.8) | 380 (15.2) | 530 (21.2) | 370 (14.8) | 380 (15.2) |
| 2% Secant Modulus, MD, psi | 39,200 | 40,000 | 39,800 | 32,850 | 34,400 | 34,800 |
| (N/mm²) | (270) | (276) | (274) | (226) | (237) | (240) |
| 2% Secant Modulus, TD, psi | 42,100 | 50,100 | 46,200 | 37,400 | 42,450 | 42,200 |
| (N/mm²) | (290) | (352) | (319) | (258) | (293) | (291) |
| Peel Strength from Al, MD, lb force per inch width (N/cm width) | 0.43 (0.74) | 0.51 (0.88) | 0.37 (0.64) | 0.53 (0.92) | 0.35 (0.61) | 0.02 (0.03) |
| Hagerty Roughness, mL/M (Shefield Units) | 569 (77.3) | 471 (66.7) | 311 (45.2) | 254 (36.4) | 213 (30.6) | 150 (21.5) |

MD is machine direction; TD is transverse direction;

sufficient to allow lamination without film breakage, but not so high as to be impossible to cut and handle. This corresponds to preferably at least about 1, more preferably at least about 1.5, most preferably at least about 2 and preferably at most about 25, more preferably at most about 20, most preferably at most about 15 g/μm.

In the practice of the present invention, the 2% Secant Modulus, both MD and TD independently should be at least sufficient to allow lamination with out film stretching, but not so high as to fail to conform to the surface topography. This corresponds to preferably at least about 210, more preferably at least about 220, most preferably at least about 230 and preferably at most about 450, more preferably at most about 425, most preferably at most about 400 N/mm$^2$.

In the practice of the present invention, the Peel Strength from aluminum should be at least sufficient to avoid unintentional removal or unassisted removal of the multilayer film from a protected surface, but not so high as to leave an adhesive residue behind when removed. While the desirable peel strength varies as a function of the surface to be protected, for an average aluminum surface, this corresponds to preferably at least about 0.40, more preferably at least about 0.50, most preferably at least about 0.60 and preferably at most about 1.1, more preferably at most about 1.0 N per cm of width.

When the multilayer film of the invention is used to protect a freshly painted surface or other surface that has not yet completely hardened, the Hagerty Roughness should be at least sufficient to avoid contributing an undesirable degree of visually observable glossiness to the surface, but not so high as to cause large surface disruption or undesirable irregularities in a painted surface. When the film is used for these incompletely hardened surfaces, especially freshly painted surfaces, this corresponds to preferably at least about 220, more preferably at least about 225, most preferably at least about 250 and preferably at most about 700, more preferably at most about 675, most preferably at most about 650 mL/M.

The invention claimed is:

1. A multilayer film having at least 3 layers:
   (A) an adhesive layer in an amount of from 5 to 25 volume percent consisting essentially of at least about 40 weight percent of an ethylene/alkyl acrylate copolymer having a Vicat point (ASTM D1525) of no more than 40° centigrade (° C.), at least about 1 and at most about 10 weight percent of an ethylene/α, β-ethylenically unsaturated carboxylic acid copolymer, and at least about 20 weight percent of a low density polyethylene, LDPE having a density of from about 0.91 to about 0.94 g/cm$^3$, and 0 to at most about 7 weight percent filler, hereinafter referred to as composition A;
   (B) a core layer, in an amount of 50 to 90 volume percent comprising at least about 20 weight percent linear low density polyethylene (LLDPE), at least about 20 weight percent low density polyethylene different from LLDPE, at least about 10 weight percent high density polyethylene and 0 to at most about 5 weight percent filler, hereinafter referred to as composition B and
   (C) a melt barrier layer in an amount of from 5-25 volume percent, that is a layer that effectively prevents molten adhesive film layer polymer from migrating through the multilayer film surface to an external surface of the multilayer film consisting essentially of at least about 90 weight percent high density polyethylene, hereinafter referred to as composition C, with the remainder of the polymer being another polyolefin,
   and in each layer, the percentages being based upon combined weight of polymers and filler and selected to total 100 percent by weight, wherein the multilayer film is strippable, that is removable, from a surface leaving little residue visible to the eye or sufficient to stick to other substances or interfere with further use.

2. The multilayer film of claim 1 wherein the alkyl acrylate is methyl acrylate and the copolymer has a methyl acrylate content of from 26 percent by weight to 31 percent by weight, based upon copolymer weight and wherein when the multilayer film is applied to an aluminum surface, the peel strength is sufficient to avoid unintentional or unassisted removal from the surface but not so high as to leave an adhesive residue when removed.

3. The multilayer film of claim 2 wherein the ethylene/α, β-ethylenically unsaturated carboxylic acid copolymer is an ethylene/acrylic acid copolymer that has an acrylic acid content within a range of from greater than or equal to 5 percent by weight to less than or equal to 22 percent by weight, based upon copolymer weight or an ethylene/methacrylic acid copolymer.

4. The multilayer film of claim 2 wherein the ethylene/α, β-ethylenically unsaturated carboxylic acid copolymer is an ethylene/methacrylic acid copolymer.

5. The multilayer film of claim 1 wherein the ethylene/α, β-ethylenically unsaturated carboxylic acid copolymer is an ethylene/acrylic acid copolymer that has an acrylic acid content within a range of from greater than or equal to 5 percent by weight to less than or equal to 22 percent by weight, based upon copolymer weight or an ethylene/methacrylic acid copolymer and wherein when the multilayer film is applied to an aluminum surface, the peel strength is sufficient to avoid unintentional or unassisted removal from the surface but not so high as to leave an adhesive residue when removed.

6. The multilayer film of claim 5 wherein the ethylene/α, β-ethylenically unsaturated carboxylic acid copolymer is an ethylene/methacrylic acid copolymer.

7. The multilayer film of claim 1 wherein the ethylene/α, β-ethylenically unsaturated carboxylic acid copolymer is an ethylene/methacrylic acid copolymer.

8. The multilayer film of claim 1 wherein Layer C comprises from 10 to 20 volume percent of the layers of the multilayer film.

9. The multilayer film of claim 1 wherein the film has at least 2 of the following properties:
   an Ultimate Tensile Strength, MD from at least about 10 to at most about 30 N/mm$^2$;
   an Ultimate Tensile Strength, TD from at least about 8 to at most about 25 N/mm$^2$;
   an Ultimate Elongation, MD from at least about 250 to at most about 750 percent;
   an Ultimate Elongation, TD from at least about 550 to at most about 1050 percent;
   an Elmendorf Tear Strength, both MD and TD, independently from at least about 1 to at most about 25 g/μm;
   a 2% Secant Modulus, both MD and TD independently from at least about 210 at most about 450 N/mm$^2$;
   a Peel Strength from aluminum from at least about 0.40, more preferably to at most about 1.1 N per cm of width; and
   a Hagerty Roughness from at least about 220 to at most about 700 mL/M.

10. The multilayer film of claim 1 wherein the film has a 230° Fahrenheit (110° centigrade) hot bar seal bond strength to a surface of aluminum foil, with a two second seal time that is greater than the 230° Fahrenheit (110° centigrade) hot bar seal bond strength of a multilayer film structure having the same melt barrier layer, and the same intermediate core layer, but with an adhesive layer that contains the same ethylene/ methyl acrylate copolymer and is substantially free of the ethylene/acrylic acid copolymer.

11. The multilayer film of claim 1 wherein it is a part of a laminate further comprising at least solid material having a surface directly adhered to the multilayer film.

12. The multilayer film of claim 11 wherein the solid material comprises wood, wood product, or cementitious material, painted metal, plastic or a combination thereof.

13. A process of applying a multilayer film of claim 1 to at least one acrylic paint surface by lamination at a film temperature at or above 71.1° C.

14. The process of claim 13 wherein the multilayer film is applied to at least one painted wood surface, painted wood product surface, painted cementitious surface, painted metal surface, or plastic surface.

* * * * *